United States Patent
Cheng

(10) Patent No.: US 9,116,064 B2
(45) Date of Patent: Aug. 25, 2015

(54) STRUCTURE OF BUILT-IN SELF-TEST FOR PRESSURE TESTER AND METHOD THEREOF

(71) Applicant: King Yuan Electronics Co., LTD, Hsin-Chu (TW)

(72) Inventor: Wei-Jen Cheng, Hsin-Chu (TW)

(73) Assignee: King Yuan Electronics Co., Ltd., Hsin-chu (TW)

( * ) Notice: Subject to any disclaimer, the term of this patent is extended or adjusted under 35 U.S.C. 154(b) by 251 days.

(21) Appl. No.: 13/728,915

(22) Filed: Dec. 27, 2012

(65) Prior Publication Data

US 2014/0083158 A1 Mar. 27, 2014

(30) Foreign Application Priority Data

Sep. 25, 2012 (TW) .............................. 101135132 A

(51) Int. Cl.
*G01L 27/00* (2006.01)

(52) U.S. Cl.
CPC ...................................... *G01L 27/00* (2013.01)

(58) Field of Classification Search
USPC .............. 73/862.381, 862.451, 862.581, 708, 73/727, 724, 715, 1.08, 1.57, 1.58
See application file for complete search history.

(56) References Cited

U.S. PATENT DOCUMENTS

2010/0192694 A1 * 8/2010 Hammerschmidt ............ 73/708

FOREIGN PATENT DOCUMENTS

| DE | 102007043073 | * | 3/2009 | .............. G01L 27/00 |
| TW | 201015055 A | | 4/2010 | |
| WO | WO 2008061832 A2 | * | 5/2008 | |

OTHER PUBLICATIONS

De Bruyker et al., "A Combined Piezoresistive/Capacitive Pressure Sensor with Self-Test Function Based on Thermal Actuation", Transducers '97, 1997 International Conference on Solid-State Sensors and Actuators, pp. 1461-1464.
Lapadatu et al., "A New Concept for a Self-Testable Pressure Sensor Based on the Bimetal Effect", Sensors and Actuators 82 (2000), pp. 69-73.
Office Action Dated Mar. 20, 2015 in corresponding Chinese Patent Application No. 2012103813103.
Office Action Dated Dec. 2, 2014 in corresponding Taiwan Patent Application No. 101135132.

* cited by examiner

*Primary Examiner* — Eric S McCall
*Assistant Examiner* — Anthony W Megna Fuentes
(74) *Attorney, Agent, or Firm* — Donald E. Stout; Stout, Uxa & Buyan, LLP

(57) ABSTRACT

A built-in self-test structure for a pressure tester and a method thereof are provided. The built-in self-test structure includes a substrate, a plurality of membrane layers, a fixing portion, an electrical heating unit and a sensing circuit unit. The membrane layers are formed on the substrate. The fixing portion is configured on the membrane layers and includes a notch. The notch and the membrane layers define a cavity. The electrical heating unit is configured on one membrane layer, and the sensing circuit unit is configured on another membrane layer. The electrical heating unit heats up to increase the pressure in the cavity according to an input voltage, so that the membrane layers have a small deformation. The sensing circuit unit outputs a test signal according to the small deformation.

13 Claims, 4 Drawing Sheets

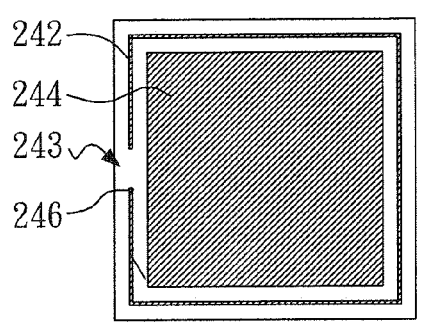
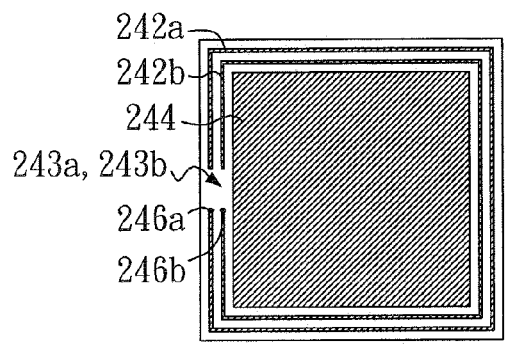
FIG.2A  FIG.2B
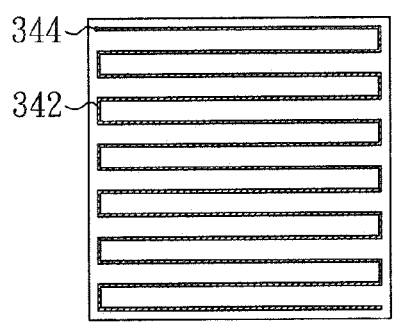
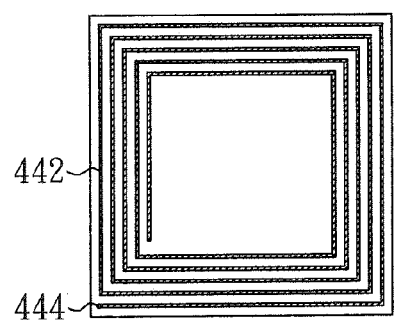
FIG.3  FIG.4

STRUCTURE OF BUILT-IN SELF-TEST FOR PRESSURE TESTER AND METHOD THEREOF

CROSS-REFERENCE TO RELATED APPLICATIONS

The entire contents of Taiwan Patent Application No. 101135132, filed on Sep. 25, 2012, from which this application claims priority, are incorporated herein by reference.

BACKGROUND OF THE INVENTION

1. Field of the Invention

The present invention generally relates to a built-in self-test structure for a pressure tester, and more particularly to a built-in self-test structure for the wafer-level pressure tester to effectively reduce the testing cost and improve the testing efficiency.

2. Description of Related Art

As the micro-electromechanical system (MEMS) device is widely used in many applications and the semiconductor technology has also become mature gradually, the price of the MEMS device has been decreased. On the other hand, the overall cost is difficult to reduce due to the high cost of using the high-priced test equipment.

More particularly, a general test of wafer-level devices must need the specific test equipment and the corresponding test environment, especially in the test process of the pressure sensor. In the conventional testing method, the test equipment is used to build up a vacuum cavity or provide an external pressure to detect the device, and therefore it is unable to effectively reduce the testing cost, which makes it difficult to increase the market share and maximize profit.

A need has thus arisen to propose a built-in self-test structure for wafer-level devices in an effective and economic manner.

SUMMARY OF THE INVENTION

In view of the foregoing, it is an object of embodiments of the present invention to provide a built-in self-test structure for a pressure tester and a method thereof.

According to one embodiment, a built-in self-test structure for a pressure tester includes a substrate, a plurality of membrane layers, a fixing portion, an electrical heating unit and a sensing circuit unit. The membrane layers are formed on the substrate. The fixing portion is configured on the membrane layers. The fixing portion includes a notch, and the notch and the membrane layers define a cavity. The electrical heating unit is configured on one membrane layer, and the sensing circuit unit is configured on another membrane layer. The electrical heating unit heats up to increase the pressure in the cavity according to an input voltage, so that the membrane layers have a small deformation, and then the sensing circuit unit outputs a test signal according to the small deformation.

According to another embodiment of the present invention, the method using a built-in self-test structure for a pressure tester includes the following steps: firstly, providing an input voltage to a built-in self-test structure; secondly, heating up to increase the pressure in the cavity according to an input voltage, so that the membrane layers have a small deformation; and thirdly, outputting a test signal according to small deformation.

BRIE DESCRIPTION OF THE DRAWINGS

FIG. 2A shows a top view of an electrical heating unit according to another embodiment of the invention;

FIG. 2B shows a top view of an electrical heating unit according to another embodiment of the invention;

FIG. 3 shows a top view of an electrical heating unit according to another embodiment of the invention;

FIG. 4 shows a top view of an electrical heating unit according to another embodiment of the invention;

Figure 5A:
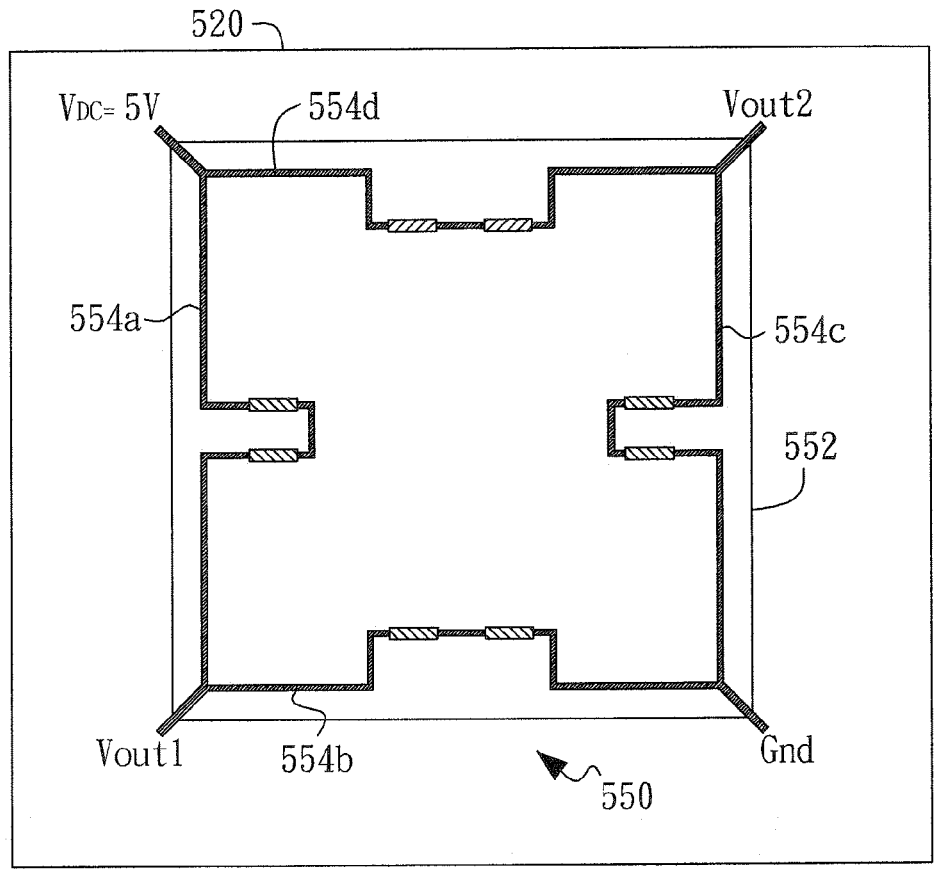
Figure 5B:
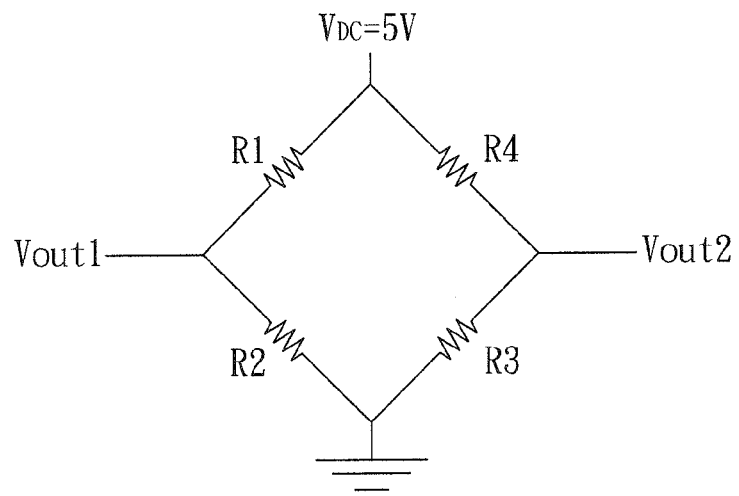
Figure 6:
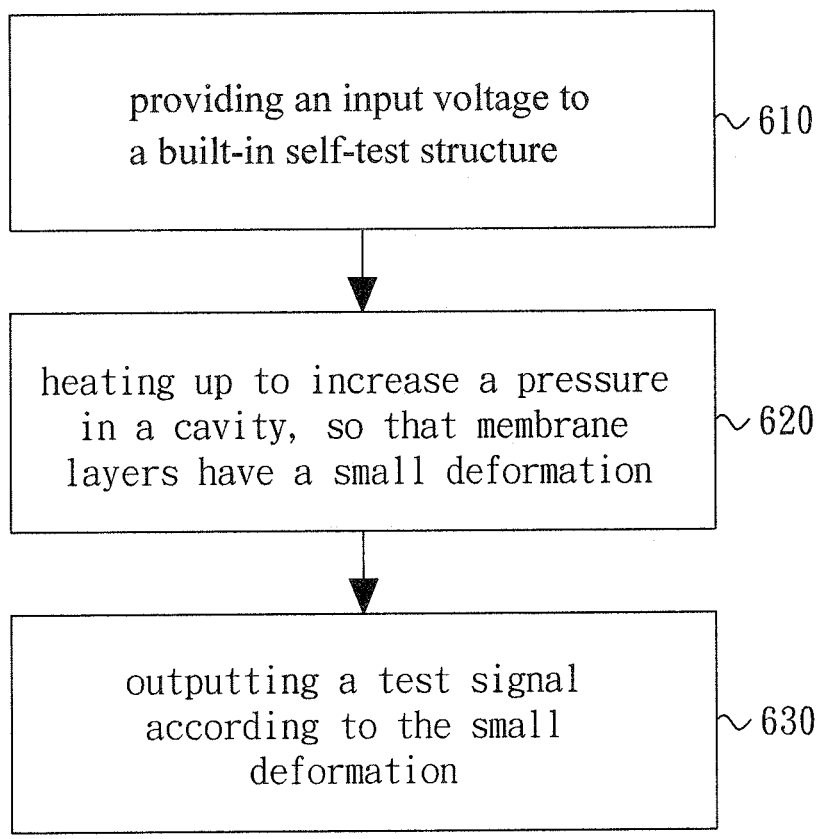

FIG. 5A schematically shows a sensing circuit unit according to another embodiment of the invention;

FIG. 5B schematically shows an equivalent circuit diagram of the sensing circuit unit in FIG. 5A; and FIG. 6 shows a flow diagram illustrative of a method of using a built-in self-test structure for a pressure tester according to another embodiment of the present invention.

DETAILED DESCRIPTION OF THE INVENTION

The detailed description of the present invention will be discussed in the following embodiments, which are not intended to limit the scope of the present invention, and can be adapted for other applications. While drawings are illustrated in detail, it is appreciated that the quantity of the disclosed components may be greater or less than that disclosed, except where expressly restricting the amount of the components.

Figure 1:
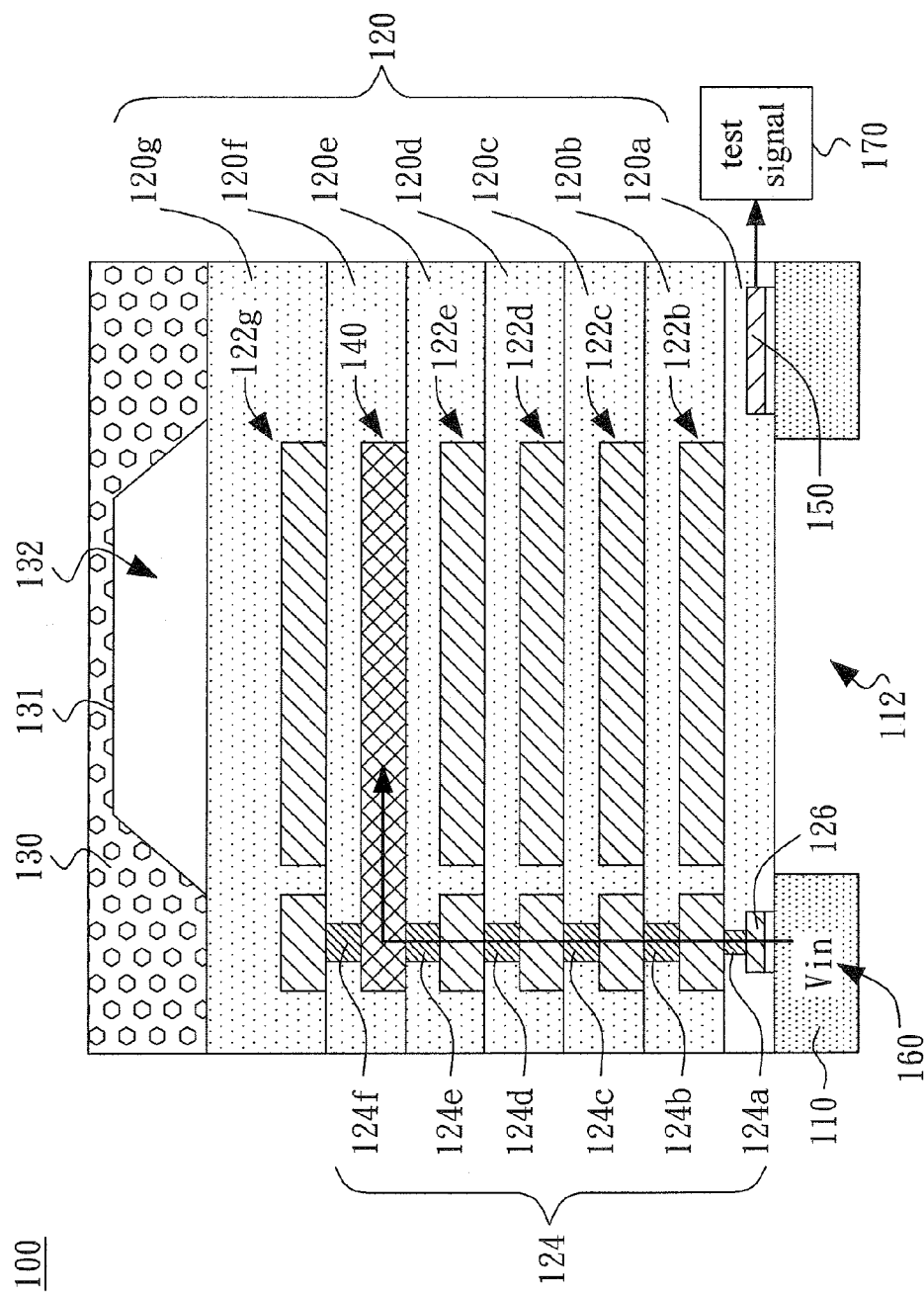
FIG. 1 shows a cross-sectional view of a built-in self-test structure for a pressure tester according to an embodiment of the invention.

Referring to FIG. 1, FIG. 1 shows a cross-sectional view of a built-in self-test structure 100 for a pressure tester according to an embodiment of the invention. The built-in self-test structure 100 includes a substrate 110, a plurality of membrane layers 120, a fixing portion 130, an electrical heating unit 140 and a sensing circuit unit 150. The membrane layers 120 are formed on the substrate 110. The fixing portion 130 is configured on the membrane layers 120. The fixing portion 130 includes a notch 131, and the notch 131 and the membrane layers 120 define a closed cavity 132. The electrical heating unit 140 is configured on one membrane layer 120f, and the sensing circuit unit 150 is configured on another membrane layer 120a. The electrical heating unit 140 heats up to increase the pressure in the cavity according to an input voltage (Vin) 160, so that the membrane layers 120 have a small deformation, and then the sensing circuit unit 150 outputs a test signal 170 according to the small deformation. In one embodiment, the electrical heating unit 140 is made of a metal material, such as aluminum or other metals having high thermal conductivities.

Therefore, when the electrical heating unit 140 receives the input voltage (Vin) 160 to heat up, the pressure in the cavity 132 will be increased so as to apply an external stress to the membrane layers 120, resulting in a small deformation. The membrane layer 120g close to the cavity 132 may be the first one to have a small deformation caused by the external force, and then the membrane layer 120g may apply a membrane stress to the adjacent membrane layer 120f, which makes membrane layer 120f to have a small deformation, and so on. Correspondingly, the membrane layers 120a-120e may have the small deformation in sequence.

As a result, the sensing circuit unit 150 may immediately detect the small deformation of the membrane layers 120a-120e to generate a test signal 170, which may be used to determine whether the membranes are complete or not.

Furthermore, in this embodiment, the CMOS MEMS (micro-electromechanical systems) semiconductor fabrication process is used to form the membrane layers 120a-120g on the substrate 110, and the membrane layers 120 are made of silicon oxide. The electrical heating unit 140 is formed of the metal layer on the membrane layers 120f. Similarly, the sensing circuit unit 150 is also formed of the metal layer on the membrane layers 120a. Moreover, as shown in FIG. 1, the membrane layers 120b-120e and the membrane layers 120g may respectively have the corresponding metal layers 122b-122e and metal layer 122g in accordance with the actual needs.

However, those skilled in the art would understand that the quantity and the configuration of the membrane layers of the present invention are not limited to those described herein.

In one embodiment, the substrate 110 has an opening 112, position of which corresponds to that of the metal layer 122 of the membrane layers 120.

Furthermore, in another embodiment, the membrane layers 120 may include via holes 124. As shown in FIG. 1, the membrane layers 120a-120f respectively have via holes 124a-124f, for transmitting the input voltage 160 from an input terminal 126 to the electrical heating unit 140.

Referring to FIG. 2A and FIG. 2B, FIG. 2A and FIG. 2B respectively show top views of the electrical heating unit according to another embodiment of the present invention. As shown in FIG. 2A, the electrical heating unit 240 is a circular-shaped structure. The electrical heating unit. 240 includes a metal ring member 242, a rectangular metal sheet 244 and a feeding point 246. The metal ring member 242 has a gap 243, and the feeding point 246 is situated on one end of the metal ring member 242 for receiving the input voltage 160. Furthermore, the metal ring member 242 is configured to surround the rectangular metal sheet 244. More specifically, FIG. 2A shows a circular structure having a single ring.

Similarly, FIG. 2B shows a circular structure having double rings. As shown in FIG. 2B, the electrical heating unit 240 includes two metal ring members 242a and 242b, a rectangular metal sheet 244 and two feeding points 246a-246b. The metal ring members 242a and 242b respectively have corresponding gaps 243a and 243b. The feeding points 246a and 246b are respectively situated on each one end of the metal ring members 242a and 242b, and the metal ring members 242a and 242b are parallel to each other and surround the rectangular metal sheet 244 as well.

Referring to FIG. 3, FIG. 3 shows a top view of the electrical heating unit according to another embodiment of the present invention. The electrical heating unit 340 is a meander-shaped structure. The electrical heating unit 340 includes a metal member 342 and a feeding point 344. The metal member 342 has a meander shape, and the feeding point 344 is situated on one end of the metal member 342.

Referring to FIG. 4, FIG. 4 shows a top view of the electrical heating unit according to another embodiment of the present invention. The electrical heating unit 440 is a loop-shaped structure. The electrical heating unit 440 includes a metal member 442 and a feeding point 444. The metal member 442 has a loop shape, and the feeding point 444 is situated on one end of the metal member 442.

Then, referring to FIG. 5A and FIG. 5B, FIG. 5A schematically shows a sensing circuit unit according to another embodiment of the invention, and FIG. 5B schematically shows an equivalent circuit diagram of the sensing circuit unit in FIG. 5A. As shown in FIG. 5A, the sensing circuit unit 550 includes a wheatstone bridge circuit. More specifically, the sensing circuit unit 550 includes a polysilicon layer 552 and four resistor elements 554a-554d. The resistor elements 554a-554d are connected to each other on the surface of the polysilicon layer 552 in order to form a wheatstone bridge circuit. The resistor values of the resistor elements 554a-554d may vary with the stress deformation of the resistor elements 554a-554d. When the resistor element is extended, the resistor value will be increased, and when the resistor element is compressed, the resistor value will be decreased.

In addition, the sensing circuit unit 550 further includes a DC voltage input terminal (Vdc) and two voltage output terminals (Vout1 and Vout2). The DC voltage input terminal is simultaneously connected to one end of the resistor element 554a and one end of the resistor element 554d. In this embodiment, a 5 Volt DC voltage is provided. The voltage output terminal Vout1 is simultaneously connected to another end of the resistor element 554a and one end of the resistor element 554b. The voltage output terminal Vout2 is simultaneously connected to one end of the resistor element 554c and another end of the resistor element 554d. Furthermore, both of another end of the resistor element 554b and another end of the resistor element 554c are connected to a ground.

As shown in FIG. 5B, the resistor elements 554a-554d may be respectively equivalent to the resistances R1-R4. The sensing circuit unit 550 may sense the variation of the resistance R1-R4, which is caused by the increasing pressure in the cavity, by detecting the output voltages from the voltage output terminals Vout1 and Vout2, so as to determine if the membrane layers 520 are complete or not. For example, when one membrane layer is incomplete or defective thereon, the resistor values of the resistances R1-R4 will not be changed. That is, the output voltages from voltage output terminals Vout1 and Vout2 are nearly the same.

Referring to FIG. 6, FIG. 6 shows a flow diagram of a method 600 using a built-in self-test structure for a pressure tester according to an embodiment of the present invention. As shown in FIG. 6, the method 600 includes steps 610, 620 and 630. However, as the built-in self-test structure used in the method 600 has been disclosed in above embodiments, the similarities will not be repeated here again.

In step 610, an input voltage may be provided to a built-in self-test structure. In step 620, the pressure in the cavity may be increased by increasing the temperature in the cavity, so the membrane layers may have the small deformation correspondingly. In step 630, a test signal may be generated and outputted according to the small deformation.

More specifically, in step 610, the input voltage is provided to the electrical heating unit of the built-in self-test structure. However, in one embodiment, the input voltage from an input terminal is transmitted to the electrical heating unit by via holes of the membrane layers. Then, in step 620, when the electrical heating unit receives input voltage, the electrical heating unit may heat up to increase the pressure in the cavity according to the input voltage. Afterwards, the stress caused by the increasing pressure in the cavity may be applied to the membrane layers. Therefore, the membrane layers may correspondingly have a small deformation in sequence.

In step 630, the method 600 may use the sensing circuit unit to detect the small deformation of the membrane layers and then correspondingly output a test signal. In one embodiment, method 600 may use the sensing circuit unit, which is equivalent to a wheatstone bridge circuit, to detect the variation of the resistor value for determining whether the membrane layers are complete and then outputting a test signal correspondingly.

Therefore, in accordance with the built-in self-test structure for a pressure tester and the method thereof in the above embodiments of the present invention, the test of wafer-level devices may be well performed by using simple and low-cost testing equipment. As a result, it not only can significantly reduce the testing cost, but also may effectively shorten the testing time to improve the testing efficiency.

Although specific embodiments have been illustrated and described, it will be appreciated by those skilled in the art that various modifications may be made without departing from the scope of the present invention, which is intended to be limited solely by the appended claims.

What is claimed is:

1. A built-in self-test structure for a pressure tester, comprising:
 a substrate;
 a plurality of membrane layers, stacked in sequence and formed on the substrate;
 a fixing portion, configured on the membrane layers, wherein the fixing portion have a notch, and the notch and the membrane layers defining a cavity;
 an electrical heating unit, configured on one membrane layer; and
 a sensing circuit unit, configured on another membrane layer;
 wherein the electrical heating unit heats up to increase a pressure in the cavity according to an input voltage, so that the membrane layers have a deformation caused by the pressure in the cavity, and then the sensing circuit unit outputs a test signal according to the deformation.

2. The built-in self-test structure of claim 1, wherein the electrical heating unit is made of a metal material.

3. The built-in self-test structure of claim 1, wherein the another one membrane layer, on which the sensing circuit unit is configured, is connected to the substrate.

4. The built-in self-test structure of claim 1, wherein the substrate has an opening.

5. The built-in self-test structure of claim 1, wherein the membrane layers have via holes.

6. The built-in self-test structure of claim 2, wherein the electrical heating unit has a circular shape.

7. The built-in self-test structure of claim 6, wherein the electrical heating unit comprises a metal ring member and a rectangular metal sheet, and the metal ring member has a gap configured to surround the rectangular metal sheet.

8. The built-in self-test structure of claim 2, wherein the electrical heating unit has a meander shape.

9. The built-in self-test structure of claim 2, wherein the electrical heating unit has a loop shape.

10. The built-in self-test structure of claim 1, wherein the sensing circuit unit comprises a wheatstone bridge circuit.

11. A method using a built-in self-test structure for a pressure tester, wherein the pressure tester has a plurality of membrane layers stacked in sequence and a fixing portion with a notch, and the notch and the membrane layers defining a cavity, the method comprising:
 providing an input voltage to the built-in self-test structure;
 heating up to increase a pressure in the cavity according to the input voltage by an electrical heating unit configured on one membrane layer, so that the membrane layers have a deformation caused by the pressure in the cavity; and
 outputting a test signal by a sensing circuit unit, configured on another membrane layer, according to the deformation.

12. The method of claim 11, wherein the step of providing the input voltage comprises:
 inputting the input voltage from an input terminal, and transmitting the input voltage to the electrical heating unit by via holes of the membrane layers.

13. The method of claim 11, wherein the sensing circuit unit is equivalent to a wheatstone bridge circuit.

* * * * *